United States Patent
Moore et al.

(10) Patent No.: US 9,593,044 B2
(45) Date of Patent: Mar. 14, 2017

(54) GYPSUM PANELS, CORES, AND METHODS FOR THE MANUFACTURE THEREOF

(71) Applicant: Georgia-Pacific Gypsum LLC, Atlanta, GA (US)

(72) Inventors: Michael H. Moore, Fletcher, OK (US); Christopher J. Sanders, Southaven, MS (US)

(73) Assignee: Georgia-Pacific Gypsum LLC, Atlanta, GA (US)

( * ) Notice: Subject to any disclaimer, the term of this patent is extended or adjusted under 35 U.S.C. 154(b) by 0 days.

(21) Appl. No.: 14/941,777

(22) Filed: Nov. 16, 2015

(65) Prior Publication Data

US 2016/0168026 A1    Jun. 16, 2016

Related U.S. Application Data

(60) Provisional application No. 62/080,625, filed on Nov. 17, 2014.

(51) Int. Cl.

| | |
|---|---|
| *C04B 14/42* | (2006.01) |
| *C04B 28/14* | (2006.01) |
| *E04B 2/56* | (2006.01) |
| *E04B 9/06* | (2006.01) |
| *E04B 1/94* | (2006.01) |
| *E04B 9/00* | (2006.01) |
| *E04C 2/06* | (2006.01) |
| *E04C 5/07* | (2006.01) |
| *E04C 2/04* | (2006.01) |

(52) U.S. Cl.
CPC .............. *C04B 14/42* (2013.01); *C04B 28/14* (2013.01); *E04B 1/942* (2013.01); *E04B 2/56* (2013.01); *E04B 9/001* (2013.01); *E04B 9/06* (2013.01); *E04C 2/043* (2013.01); *E04C 2/06* (2013.01); *E04C 5/07* (2013.01)

(58) Field of Classification Search
CPC . C04B 14/42; C04B 28/14; E04C 2/44; E04C 2/02; E04C 2/043; E04C 5/07; E04C 2/06; E04B 9/06; E04B 2/56; E04B 1/942; E04B 9/001
See application file for complete search history.

(56) References Cited

U.S. PATENT DOCUMENTS

| | | | | |
|---|---|---|---|---|
| 3,616,173 A | * | 10/1971 | Green | E04B 1/94 106/711 |
| 3,944,698 A | * | 3/1976 | Dierks | B28B 1/522 156/42 |
| 4,119,752 A | * | 10/1978 | Long | B32B 13/08 156/39 |
| 4,564,544 A | * | 1/1986 | Burkard | C04B 14/20 428/537.1 |
| 5,922,447 A | * | 7/1999 | Baig | B32B 13/08 106/675 |
| 5,962,119 A | * | 10/1999 | Chan | B28B 19/0092 156/43 |

(Continued)

*Primary Examiner* — Babajide Demuren
(74) *Attorney, Agent, or Firm* — Ram W. Sabnis (57) ABSTRACT

Gypsum panels, panel cores, and methods for the manufacture thereof are provided herein. A gypsum panel core includes gypsum and fiberglass, the fiberglass being present in the core in an amount of from about 1 lb/msf to about 6 lb/msf. The core has a thickness of about ½ inch, a weight of from about 1400 lb/msf to about 1750 lb/msf, and an ASTM E-119 wood stud fire test rating of at least 30 minutes.

14 Claims, 4 Drawing Sheets

(56) References Cited

U.S. PATENT DOCUMENTS

| | | | | |
|---|---|---|---|---|
| 6,319,312 B1* | 11/2001 | Luongo | E04C 2/043 | 106/672 |
| 6,342,284 B1* | 1/2002 | Yu | C04B 22/16 | 106/772 |
| 6,632,550 B1* | 10/2003 | Yu | C04B 22/16 | 106/772 |
| 6,783,587 B2* | 8/2004 | Sethuraman | C04B 28/147 | 106/674 |
| 7,736,720 B2* | 6/2010 | Yu | B32B 13/02 | 106/778 |
| 7,803,226 B2* | 9/2010 | Wang | C04B 28/14 | 106/772 |
| 8,038,790 B1* | 10/2011 | Dubey | B28B 1/522 | 106/675 |
| 8,323,785 B2* | 12/2012 | Yu | C04B 20/06 | 106/772 |
| 2003/0084980 A1* | 5/2003 | Seufert | C04B 24/383 | 156/39 |
| 2005/0263925 A1* | 12/2005 | Heseltine | C03C 13/001 | 264/109 |
| 2006/0272764 A1* | 12/2006 | Smith | B32B 13/08 | 156/204 |
| 2006/0278133 A1* | 12/2006 | Yu | C04B 28/14 | 106/772 |
| 2007/0251628 A1* | 11/2007 | Yu | B32B 13/04 | 156/39 |
| 2008/0057318 A1* | 3/2008 | Adzima | B32B 13/14 | 428/426 |
| 2008/0070026 A1* | 3/2008 | Yu | B32B 13/08 | 428/312.4 |
| 2009/0011207 A1* | 1/2009 | Dubey | C04B 20/1051 | 428/219 |
| 2009/0047545 A1* | 2/2009 | Yu | C04B 22/16 | 428/703 |
| 2010/0197182 A1* | 8/2010 | Barzilai | E04B 1/942 | 442/1 |
| 2011/0195241 A1* | 8/2011 | Yu | C04B 20/06 | 428/220 |
| 2012/0219785 A1* | 8/2012 | Yu | C04B 20/06 | 428/312.4 |
| 2012/0237756 A1* | 9/2012 | Lee | B32B 3/26 | 428/312.4 |
| 2014/0315008 A1* | 10/2014 | Francis | B28B 19/0092 | 428/220 |

* cited by examiner

GYPSUM PANELS, CORES, AND METHODS FOR THE MANUFACTURE THEREOF

CROSS-REFERENCE TO RELATED APPLICATIONS

The present application claims priority to U.S. Provisional Patent Application No. 62/080,625, filed Nov. 17, 2014, which is incorporated by reference herein.

FIELD

The present disclosure relates to gypsum panels, and more particularly to fire resistant gypsum panel cores and methods for the manufacture thereof.

BACKGROUND

Gypsum panels, or wallboards, are used in commercial and residential building construction to form the partitions or walls of rooms, hallways, ceilings, and the like, and in exterior wall or roof construction.

In commercial or institutional applications, gypsum board products may have fire resistance ratings of one hour or higher. However, to achieve such fire resistance ratings, boards having a thickness of ½ inch or greater are very heavy, with weights of at least 1800 pounds per thousand square feet (lb/msf). Moreover, to achieve a fire resistance rating of one hour or more, these boards typically include a number of additives in the core in relatively large proportions. Due to their high weight and the cost associated with manufacturing cores containing the necessary additives, such boards are generally not used in residential construction.

Instead, lower weight boards, with weights of 1450 lb/msf or lower, are typically used in residential construction. However, these low weight boards typically do not achieve a 30 or 45 minute fire resistance performance level, even with the addition of core additives to improve their fire resistance.

Accordingly, gypsum panels and cores having improved fire resistance and high temperature board integrity are desirable.

SUMMARY

In one aspect, a gypsum panel core is provided, including gypsum and fiberglass, the fiberglass being present in the core in an amount of from about 1 lb/msf to about 6 lb/msf. The core has a thickness of about ½ inch, a weight of from about 1400 lb/msf to about 1750 lb/msf, and an ASTM E-119 wood stud fire test rating of at least 30 minutes.

In another aspect, a gypsum panel is provided, including (i) a core having a thickness of about ½ inch and a weight of from about 1400 lb/msf to about 1750 lb/msf, the core including gypsum and fiberglass, the fiberglass being present in the core in an amount of from about 1 lb/msf to about 6 lb/msf, and (ii) at least one paper facer provided on a face of the core. The core has an ASTM E-119 wood stud fire test rating of at least 30 minutes.

In yet another embodiment, a method of making a gypsum panel is provided, including (i) combining gypsum stucco, water, and fiberglass to form a slurry, and (ii) setting the slurry to form a core having a thickness of about ½ inch, a weight of from about 1400 lb/msf to about 1750 lb/msf, and containing fiberglass in an amount of from about 1 lb/msf to about 6 lb/msf. The core has an ASTM E-119 wood stud fire test rating of at least 30 minutes.

DETAILED DESCRIPTION

Disclosed herein are gypsum panels, panel cores, and methods for manufacturing such panels and cores. These cores and panels provide one or more improvements over known gypsum cores and panels by offering fire resistant mid-weight gypsum based panels without requiring large amounts of fire resistance enhancing additives. In particular, the gypsum panel cores of the present disclosure have a thickness of ½ inch and a weight of from about 1400 lb/msf to about 1750 lb/msf. These cores also have an ASTM E-119 wood stud fire test rating of at least 30 minutes. The ASTM E-119 test indicates the duration for which a gypsum panel or core in a wall assembly contains a fire and substantially retains its structural integrity when exposed to fire conditions.

Gypsum panels, panel cores, and methods for manufacturing such panels and cores are described in detail below.

Gypsum Panels and Cores

In certain embodiments, a gypsum panel core includes gypsum and fiberglass and has a thickness of about ½ inch and a weight of from about 1400 lb/msf to about 1750 lb/msf. The core contains fiberglass in an amount of from about 1 lb/msf to about 6 lb/msf and has an ASTM E-119 wood stud fire test rating of at least 30 minutes.

As used herein, the term "a thickness of about ½ inch" refers to core products having a thickness of ½ inch plus or minus 1/16 inch. That is, panels having a thickness of 5/8 inch are not intended to come within the scope of the present disclosure.

In some embodiments, the core has an ASTM E-119 wood stud fire test rating of greater than or equal to 30 minutes and less than 60 minutes. In one embodiment, the core has an ASTM E-119 wood stud fire test rating of at least 45 minutes.

In some embodiments, the core has a weight of from about 1450 lb/msf to about 1700 lb/msf.

In some embodiments, the fiberglass is present in the core in an amount of from about 1.5 lb/msf to about 3 lb/msf. In certain embodiments, the fiberglass is chopped glass fiber of a suitable size. For example, the glass fibers may have an average diameter from about 9 to about 17 microns and an average length from about ¼ inch to about 1.5 inch. In some embodiments, the fibers may have an average diameter of from about 13 to about 17 microns and an average length of from about ¼ inch to about ¾ inch. In one embodiment, the fiberglass fibers have an average diameter of about 16 microns and an average length of about ½ inch (such as Johns Manville Duracore SF Plus type M300, Borocalcium Alumina Silicate—Type E).

In some embodiment, the gypsum is present in the core in an amount of from about 1350 lb/msf to about 1670 lb/msf. In certain embodiments, the gypsum is present in the core in an amount of from about 1400 lb/msf to about 1620 lb/msf.

The gypsum stucco used to manufacture the core may be any suitable hemihydrate gypsum stucco, such as alpha hemihydrate gypsum, beta hemihydrate gypsum, or a combination thereof. Upon rehydration of the gypsum hemihydrate during the manufacture process, gypsum dihydrate is formed. Thus, the amount of gypsum present in a set core refers to the amount of gypsum dihydrate in the set core, whereas the amount of gypsum stucco combined with water to form the core refers to the amount of gypsum hemihydrate used.

In some embodiments, one or more additives are present in the gypsum panel core. For example, the gypsum panel core may optionally include any combination of foaming agents, dispersants, retarders, accelerators, potash, starch (such as pregelatinized starch), dextrose, boric acid, siloxane, siliconate, vermiculite (such as expandable vermiculite), clay, cement, sodium trimetaphosphate, or other suitable additives. For example, a foaming agent, such as soap, may be present in the core in an amount of from about 0.2 lb/msf to about 0.6 lb/msf, or from about 0.3 lb/msf to about 0.5 lb/msf. For example, a dispersant, such as naphthalene sulfonate, may be present in the core in an amount of from about 0.1 lb/msf to about 5 lb/msf, or from about 0.1 lb/msf to about 4 lb/msf. For example, a retarder, such as a chelating agent (for example, Dow Versinex 80), may be present in the core in an amount of from about 0.1 lb/msf to about 0.9 lb/msf, or from about 0.1 lb/msf to about 0.5 lb/msf. For example, an accelerator, such as finely ground gypsum particles, may be present in the core in an amount of from about 1 lb/msf to about 10 lb/msf, or from about 1.2 lb/msf to about 5 lb/msf. For example, potash, such as potassium sulfate, may be present in the core in an amount of from about 0.1 lb/msf to about 4 lb/msf, or from about 0.1 lb/msf to about 2 lb/msf. For example, starch, such as pregelatinized starch, may be present in the core in an amount of from about 1 lb/msf to about 11 lb/msf, or from about 5 lb/msf to about 9 lb/msf. For example, dextrose may be present in the core in an amount of from about 0.1 lb/msf to about 5 lb/msf, or from about 0.1 lb/msf to about 2 lb/msf. For example, boric acid may be present in the core in an amount of from about 0.1 lb/msf to about 6 lb/msf, or from about 0.1 lb/msf to about 3 lb/msf. For example, siloxane may be present in the core in an amount of from about 0.1 lb/msf to about 15 lb/msf, or from about 0.1 lb/msf to about 12 lb/msf. For example, siliconate may be present in the core in an amount of from about 0.1 lb/msf to about 10 lb/msf, or from about 0.1 lb/msf to about 8 lb/msf. For example, unexpanded vermiculite may be present in the core in an amount of from about 0.1 lb/msf to about 50 lb/msf, or from about 0.1 lb/msf to about 30 lb/msf. For example, clay, such as finely ground kaolin clay, may be present in the core in an amount of from about 0.1 lb/msf to about 40 lb/msf, or from about 0.1 lb/msf to about 20 lb/msf. For example, diatomaceous earth or cement may be present in the core in an amount of from about 0.1 lb/msf to about 20 lb/msf, or from about 0.1 lb/msf to about 10 lb/msf. For example, sodium trimetaphosphate may be present in the core in an amount of from about 1 lb/msf to about 12 lb/msf. For example, siloxane and/or siliconate may be used in gypsum panel cores to achieve improved water resistance. In one embodiment, the gypsum panel core further includes pregelatinized starch, sodium trimetaphosphate, vermiculite, kaolin clay, cement, or a combination thereof. For example, the use of expandable vermiculite in gypsum panels is described in U.S. Pat. No. 8,323,785, which is incorporated by reference herein. In one embodiment, the gypsum panel core further includes pregelatinized starch and sodium trimetaphosphate to attain a light, strong board, such as described in U.S. Pat. No. 7,736,720, which is incorporated by reference herein.

In some embodiments, a wall assembly built with the gypsum panel has a sound transmission class (STC) rating of greater than 30. For example, various wall assemblies or constructions made using the gypsum panel may have an STC rating of from about 31 to about 50.

In certain embodiments, a gypsum panel includes any embodiment of a gypsum panel core as described herein. For example, a gypsum panel may include a core having a thickness of about ½ inch and a weight of from about 1400 lb/msf to about 1750 lb/msf, the core containing gypsum and fiberglass, the fiberglass being present in the core in an amount of from about 1 lb/msf to about 6 lb/msf, wherein the core has an ASTM E-119 wood stud fire test rating of at least 30 minutes. A gypsum panel may also include a suitable paper facer on one or both faces of the core.

In certain embodiments, a gypsum panel core includes a densified gypsum layer, having a higher density than the typical gypsum core. Such densified, or slate coat, layers are known in the art. In the presently described gypsum panel cores, a densified gypsum layer may be provided adjacent to the a layer comprising the gypsum and fiberglass, as described herein.

In certain embodiments, gypsum panels containing the cores described herein may be used in residential construction. For example, the panels described herein may be fastened to studs (e.g., wood or metal studs) having a spacing of about 16 inches or about 24 inches.

Methods

In certain embodiments, a method of making a gypsum panel includes (i) combining gypsum stucco, water, and fiberglass to form a slurry, and (ii) setting the slurry to form a core having a thickness of about ½ inch, a weight of from about 1400 lb/msf to about 1750 lb/msf, and containing fiberglass in an amount of from about 1 lb/msf to about 6 lb/msf. The gypsum panel cores produced by this method may have any of the features, or combinations of features, described herein. For example, the core produced by this method may have an ASTM E-119 wood stud fire test rating of at least 30 minutes.

In some embodiments, the gypsum stucco is added to the slurry in an amount of about 1160 lb/msf to about 1420 lb/msf, for a core having a thickness of about ½ inch. In one embodiment, the gypsum stucco is added to the slurry in an amount of about 1200 lb/msf to about 1380 lb/msf, for a core having a thickness of about ½ inch.

In some embodiments, the water is added to the slurry in an amount of about 635 lb/msf to about 1153 lb/msf, for a core having a thickness of about ½ inch. In one embodiment, the water is added to the slurry in an amount of about 700 lb/msf to about 1061 lb/msf, for a core having a thickness of about ½ inch. For example, the water may be combined with the gypsum stucco in a ratio of from about 0.70 to about 0.84. In one embodiment, water is combined with the gypsum stucco in a ratio of from about 0.72 to about 0.80.

In some embodiments, one or more additives are combined with the stucco, water, and fiberglass in the slurry. For example, the slurry may optionally include any combination of foaming agents, dispersants, retarders, accelerators, potash, starch, dextrose, boric acid, siloxane, siliconate, vermiculite, clay, cement, or other suitable additives.

In some embodiments, a foaming agent is combined with water and is foamed with air before being combined with the stucco slurry. In certain embodiments, the foaming agent and water are foamed with an aerator. For example, a foaming agent, such as soap, may be added to the stucco slurry in an amount of from about 0.2 lb/msf to about 0.6 lb/msf, or from about 0.3 lb/msf to about 0.5 lb/msf, as measured per resulting panel core having a thickness of about ½ inch. For example, the foaming agent and water may be combined with air in an amount of about 11 cf/msf to about 22 cf/msf, or from about 13 cf/msf to about 19 cf/msf, as measured per resulting panel core having a thickness of about ½ inch. For example, water may be combined with the foaming agent in an amount of from about 40 lb/msf to about 177 lb/msf, as measured per resulting panel core having a thickness of about ½ inch. In one embodiment, water is combined with the foaming agent in an amount of from about 43 lb/msf to about 164 lb/msf, as measured per resulting panel core having a thickness of about ½ inch. In some embodiments, the total water present in the slurry (e.g., water combined with foaming agent, water combined with stucco) is from about 812 lb/msf to about 1193 lb/msf, as measured per resulting panel core having a thickness of about ½ inch. In one embodiment, the total water present in the slurry is from about 864 lb/msf to about 1104 lb/msf, as measured per resulting panel core having a thickness of about ½ inch.

For example, a dispersant, such as a naphthalene sulfonate, may be added to the slurry in an amount of from about 0.1 lb/msf to about 5 lb/msf, or from about 0.1 lb/msf to about 4 lb/msf, for a core having a thickness of about ½ inch. For example, a retarder, such as a chelating agent (for example Dow Versinex 80), may be added to the slurry in an amount of from about 0.1 lb/msf to about 0.9 lb/msf, or from about 0.1 lb/msf to about 0.5 lb/msf, for a core having a thickness of about ½ inch. For example, an accelerator, such as such as finely ground gypsum particles, may be added to the slurry in an amount of from about 1 lb/msf to about 10 lb/msf, or from about 1.2 lb/msf to about 5 lb/msf, for a core having a thickness of about ½ inch. For example, potash, such as potassium sulfate, may be added to the slurry in an amount of from about 0.1 lb/msf to about 4 lb/msf, or from about 0.1 lb/msf to about 2 lb/msf, for a core having a thickness of about ½ inch. For example, starch may be added to the slurry in an amount of from about 1 lb/msf to about 11 lb/msf, or from about 5 lb/msf to about 9 lb/msf, for a core having a thickness of about ½ inch. For example, dextrose may be added to the slurry in an amount of from about 0.1 lb/msf to about 5 lb/msf, or from about 0.1 lb/msf to about 2 lb/msf, for a core having a thickness of about ½ inch. For example, boric acid may be added to the slurry in an amount of from about 0.1 lb/msf to about 6 lb/msf, or from about 0.1 lb/msf to about 3 lb/msf, for a core having a thickness of about ½ inch. For example, siloxane may be added to the slurry in an amount of from about 0.1 lb/msf to about 15 lb/msf, or from about 0.1 lb/msf to about 12 lb/msf, for a core having a thickness of about ½ inch. For example, siliconate may be added to the slurry in an amount of from about 0.1 lb/msf to about 10 lb/msf, or from about 0.1 lb/msf to about 8 lb/msf, for a core having a thickness of about ½ inch. For example, vermiculite may be added to the slurry in an amount of from about 0.1 lb/msf to about 50 lb/msf, or from about 0.1 lb/msf to about 30 lb/msf, for a core having a thickness of about ½ inch. For example, clay, such as finely ground kaolin clay, may be added to the slurry in an amount of from about 0.1 lb/msf to about 40 lb/msf, or from about 0.1 lb/msf to about 20 lb/msf, for a core having a thickness of about ½ inch. For example, cement may be added to the slurry in an amount of from about 0.1 lb/msf to about 20 lb/msf, or from about 0.1 lb/msf to about 10 lb/msf, for a core having a thickness of about ½ inch.

In some embodiments, a method of making a gypsum panel also includes affixing a paper facer to at least one face of the core.

Examples

Sample gypsum panel cores were manufactured in accordance with the present disclosure and tested as described below.

In particular, gypsum panel cores were made according to the formulation shown in Table 1, with varying amounts of fiberglass. The foaming agent was combined with the foam water and aerated with the foam air to form a foam. The foam was then combined with a slurry of the other components and fiberglass to form the core slurry. The core slurry was allowed to set to form a gypsum panel core having a thickness of approximately ½ inch.

TABLE 1

Experimental Gypsum Panel Core Formulation

| Component | Amount Used to Make ½ inch Core |
|---|---|
| Gypsum stucco | 1240 lb/msf |
| Water | 930 lb/msf |
| Foam water | 80 lb/msf |
| Foaming agent (soap) | 0.5 lb/msf |
| Foam air | 16 cf/msf |
| Dispersant (naphthalene sulfonate) | 3.5 lb/msf |
| Retarder | 0.25 lb/msf |
| Accelerator | 1.5 lb/msf |
| Potash (potassium sulfate) | 0.8 lb/msf |
| Starch | 8 lb/msf |
| Dextrose (sugar) | 1.7 lb/msf |
| Boric acid | 2.5 lb/msf |

Figure 1:
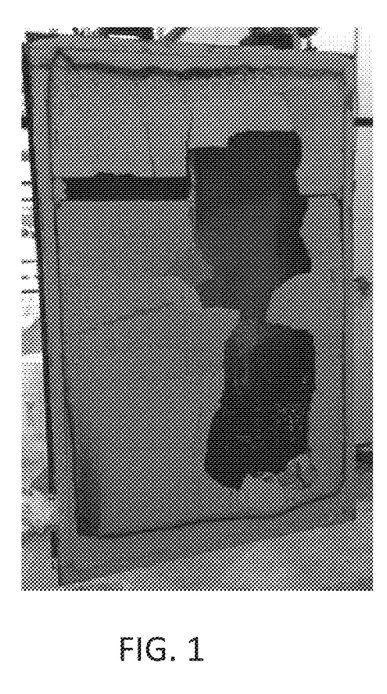
FIG. 1 is a photograph of a comparative gypsum panel core containing no fiberglass after an experimental fire test.
Figure 2:
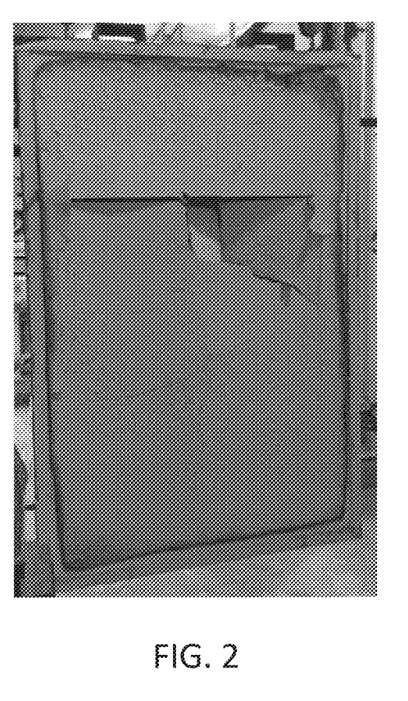
FIG. 2 is a photograph of a gypsum panel core containing fiberglass after an experimental fire test.
Figure 3:
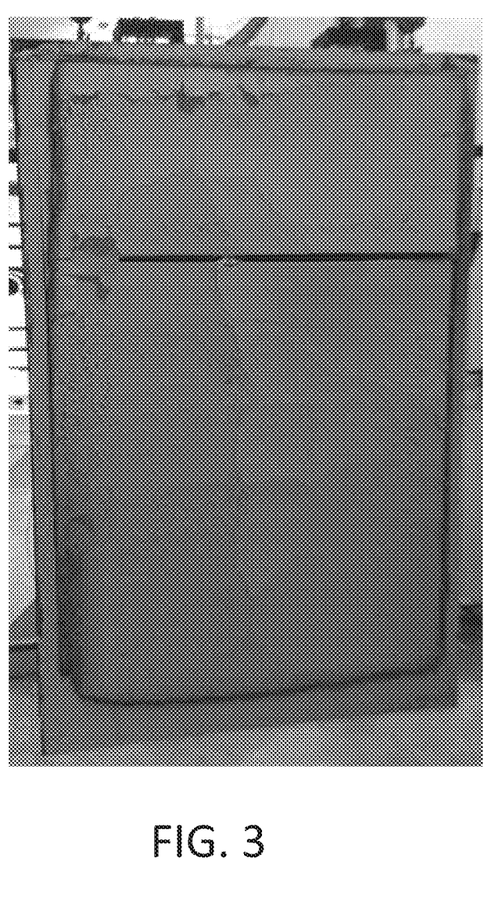
FIG. 3 is a photograph of a gypsum panel core containing fiberglass after an experimental fire test.

In one test, gypsum panel samples (3 feet by 5 feet) were prepared according to the formulation of Table 1 with fiberglass in an amount of 0 lb/msf, 1.5 lb/msf, or 3 lb/msf. The gypsum panels each had a weight of 1550 lb/msf. The three panels were subjected to identical fire testing to determine contribution of fiberglass content to fire resistance and board integrity. FIGS. 1-3 show the gypsum panel cores after the fire testing. FIG. 1 shows the panel containing 0 lb/msf of fiberglass. FIG. 2 shows the panel containing 1.5 lb/msf of fiberglass. FIG. 3 shows the panel containing 3 lb/msf of fiberglass. These tests surprisingly demonstrated that adding even a very small amount of fiberglass to the gypsum panel core provides significant fire resistance and board integrity.

In another test, samples were made according to the formulation given in Table 1, with varying fiberglass content and varying board weight. These samples were furnace tested to compare the time to failure of the panel in a fire scenario. The sample parameters and test results are shown in Table 2 below.

The test samples were prepared at two manufacturing plants (indicated as "A" and "B" in Table 2), which varied non-critical process parameters (including slight variations of core additive amounts) during core manufacturing.

Sample 11 was a commercial ⅝ inch 30 minute fire rated board tested for comparison purposes. The plant, board weight, board thickness, and core fiberglass content are given for each sample. The samples were furnace tested on various stud structures (nominal 2"×4" 20 or 25 gauge steel studs, or Douglas fir 2"×4" wood studs).

Figure 4:
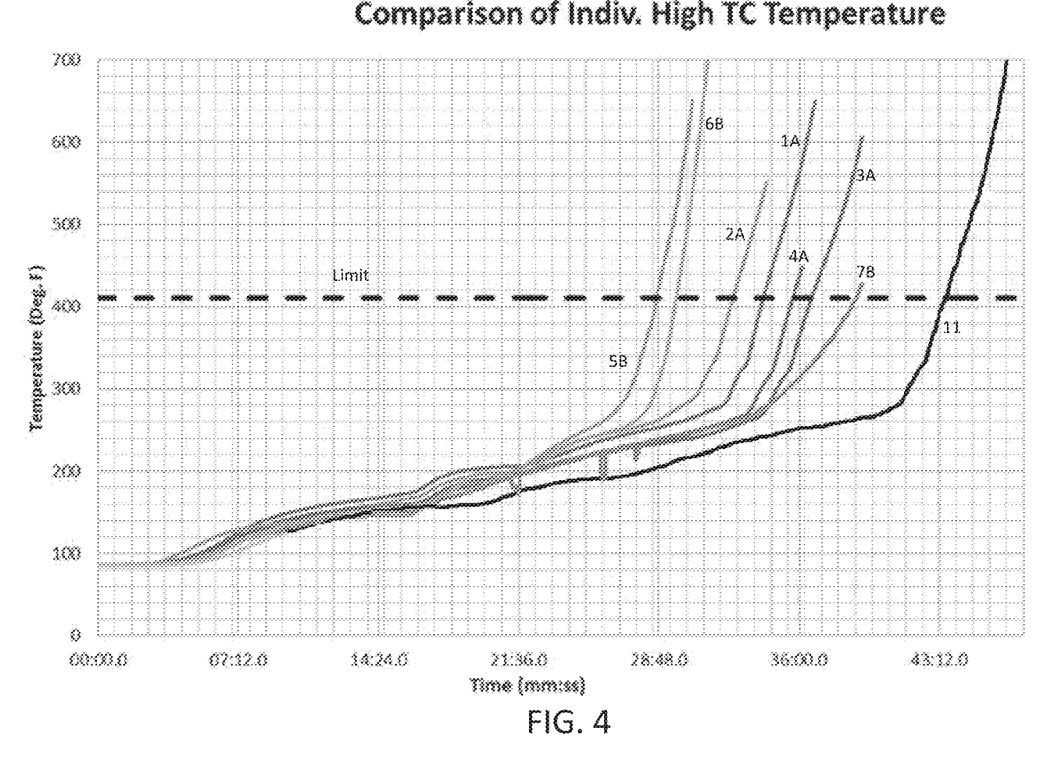
FIG. 4 is a graph showing the experimental individual thermocouple temperature measured over time for various gypsum panel core samples in an experimental fire test.
Figure 5:
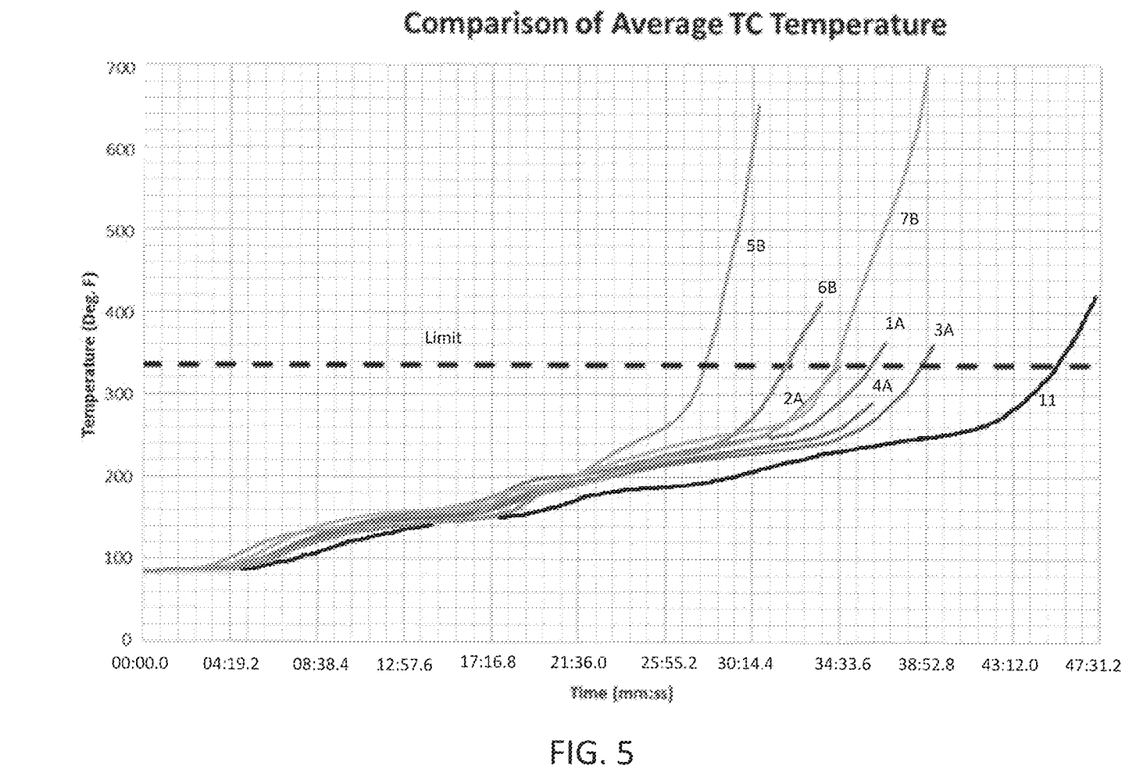
FIG. 5 is a graph showing the experimental average thermocouple temperature measured over time for various gypsum panel core samples in an experimental fire test.

Each of the samples were equipped with a number of thermocouples and then exposed to furnace temperatures, to represent a fire scenario. The thermocouples were used to monitor the ability of the panel to withstand heat transfer and the time to failure of the wall, which represents the time a panel installed as a residential wall would maintain its structural integrity during a fire. Failure time was measured both by the time it took any individual thermocouple on a panel to reach 325° F. above ambient temperature and by the time it took for the average of all thermocouples on a panel to reach 250° F. above ambient temperature. FIGS. 4 and 5 show the thermocouple measurements for the samples over time. Visual observations of panel cracking were also made.

TABLE 2

Experimental Gypsum Panel Core Parameters and Furnace Failure Test Results

| Sample | Board Weight (lb/msf) | Thickness (inch) | Fiberglass (lb/msf) | Studs | Finish Rating (mm:ss) | Individual T/C Failure Time (325° F.) (mm:ss) | Average T/C Failure Time (250° F.) (mm:ss) | Observations |
|---|---|---|---|---|---|---|---|---|
| 1A | 1431 | 0.491 | 2.2 | 20 ga. | 14:44.0 | 34:12.0 | 36:08.0 | Microfractures |
| 2A | 1550 | 0.490 | 0 | 20 ga. | 15:22.0 | 32:38.0 | 34:34.0 | Significant cracking |
| 3A | 1550 | 0.491 | 1.5 | 20 ga. | 15:16.0 | 36:40.0 | 38:38.0 | one open crack in field of lower board |
| 4A | 1551 | 0.489 | 3 | 20 ga. | 15:18.0 | 35:42.0 | — | No cracks |
| 5B | 1431 | 0.500 | 0 | 20 ga. | 15:32.0 | 28:42.0 | 27:52.0 | Multiple large cracks |
| 6B | 1556 | 0.498 | 0 | 20 ga. | 15:58.0 | 29:42.0 | 31:56.0 | Multiple cracks 17 min. into test |
| 7B | 1562 | 0.501 | 2 | 20 ga. | 15:08.0 | 38:56.0 | 34:22.0 | One crack at 20 min. into test |
| 8A | 1550 | 0.491 | 1.5 | DF wood 2" × 4" | 15:42.0 | 36:42.0 | 38:46.0 | Some cracking |
| 9A | 1550 | 0.491 | 1.5 | 25 ga. | 14:20.0 | 37:28.0 | | cracking near screw heads and micro cracks near edges |
| 10A | 1551 | 0.489 | 3 | 25 ga. | 14:26.0 | 36:06.0 | | no cracking |
| 11 | 1660 | 5/8 | | 20 ga. | 18:00.0 | 43:28.0 | 45:20.0 | micro-cracking all over, but no large cracks |

These tests showed that samples containing even small amounts of fiberglass are able to withstand the increased temperatures and maintain panel integrity during a fire much longer than panels containing no fiberglass. Additionally, board weight contributes to the fire performance of a panel.

In another test, ½ inch gypsum panel samples were prepared according to the formulation given in Table 1 and with 2 lb/msf fiberglass content. Samples were fastened to both sides of a 10'×10' wood studs wall assembly and tested according to the ASTM E-119 fire test protocol (which specifies studs spaced 16" on center). One sample was also tested on 24 inch spaced studs. The sample parameters and test results are given in Table 3.

Two panel core samples (samples 1 and 2 in Table 3) weighed 1535 lb/msf. One panel core sample (sample 3 in Table 3) weighed 1632 lb/msf (this sample included gypsum in addition to the amount given in Table 1 to increase the weight). Samples 4 and 5 in Table 3 are commercial ½ inch gypsum panel products, which had weights of 1356 lb/msf and 1392, respectively.

TABLE 3

Gypsum Panel Parameters and ASTM E-119 Results

| Sample | Panel Weight (lb/msf) | Stud Spacing (inch) | Minutes to Failure |
|---|---|---|---|
| 1 | 1535 | 16 | 47 |
| 2 | 1535 | 24 | 39 |
| 3 | 1632 | 16 | 48 |
| 4 | 1356 | 16 | 38 |
| 5 | 1392 | 16 | 34 |

The test samples containing fiberglass each achieved an ASTM E-119 fire rating of at least 30 minutes, while the samples on the standard 16 inch wood studs both achieved a fire rating of at least 45 minutes. The commercial light-weight gypsum panels on 16 inch studs did not achieve a 45 minute rating. In fact, the mid-weight fiberglass containing panel cores offered at least 10 additional minutes of fire resistance.

Thus, it was determined that by increasing the weight of gypsum panels over the current lightweight residential panels and by adding a small amount of fiberglass to the core, the fire resistance rating of the panel can be significantly improved. Compared to traditional fire rated gypsum boards, the panels of the present disclosure are lighter and do not require the addition of fire resistance enhancing additives other than fiberglass. Due to their weight and cost, such traditional fire resistance boards have not typically been used in residential construction. Instead, standard ½ inch gypsum boards that are used in residential construction are lightweight but do not offer fire resistance ratings of 30 or 45 minutes when tested in similar constructions to the gypsum board of the invention.

Accordingly, the presently disclosed gypsum panels offer a fire resistant alternative that is light enough for residential use, but also provides enhanced fire resistance by reducing shrinkage and cracking of the gypsum core through the addition of a small amount of fiberglass. These cores advantageously provide an extra level of fire resistance to slow the spread of a fire within a home, compared to other gypsum board products typically installed in residential construction.

While the disclosure has been described with reference to a number of embodiments, it will be understood by those skilled in the art that the invention is not limited to such disclosed embodiments. Rather, the invention can be modified to incorporate any number of variations, alterations, substitutions, or equivalent arrangements not described herein, but which are commensurate with the spirit and scope of the invention. Additionally, while various features of the invention have been described, it is to be understood that aspects of the invention may include only some of the described features. Moreover, while features of the embodiments have been discussed separately, it should be understood that any of the features disclosed herein may be combined in a gypsum panel core with or without any other of the features or combinations of features. Accordingly, the invention is not to be seen as limited by the foregoing description, but is only limited by the scope of the appended claims.

We claim:

1. A gypsum panel core, comprising:
    gypsum and fiberglass, the fiberglass being present in the core in an amount of from 1.5 lb/msf to 3 lb/msf and the gypsum being present in the core in an amount of from 1350 lb/msf to 1670 lb/msf,
    wherein the core has a thickness of about ½ inch and a weight of from about 1400 lb/msf to about 1750 lb/msf, and
    wherein the core has an ASTM E-119 wood stud fire test rating of at least 30 minutes and does not contain vermiculite.

2. The gypsum panel core of claim 1, wherein the core has an ASTM E-119 wood stud fire test rating of at least 45 minutes.

3. The gypsum panel core of claim 1, wherein the core has a weight of from about 1450 lb/msf to about 1700 lb/msf.

4. The gypsum panel core of claim 1, further comprising an additive selected from the group consisting of pregelatinized starch, sodium trimetaphosphate, vermiculite, kaolin clay, cement, and combinations thereof.

5. The gypsum panel core of claim 1, further comprising an additive selected from the group consisting of, siloxane, siliconate, and combinations thereof.

6. The gypsum panel core of claim 1, further comprising pregellatinzed starch and sodium trimetaphosphate.

7. A method of using a gypsum panel comprising the gypsum panel core of claim 1, in residential construction, wherein the gypsum panel is fastened to studs having a 16 inch spacing or a 24 inch spacing.

8. A gypsum panel, comprising:
    a core having a thickness of about ½ inch and a weight of from about 1400 lb/msf to about 1750 lb/msf, the core comprising gypsum and fiberglass, the fiberglass being present in the core in an amount of from 1.5 lb/msf to 3 lb/msf and the gypsum being present in the core in an amount of from 1350 lb/msf to 1670 lb/msf; and
    a paper facer provided on at least one face of the core,
    wherein the core has an ASTM E-119 wood stud fire test rating of at least 30 minutes and does not contain vermiculite.

9. The gypsum panel of claim 8, wherein the core has an ASTM E-119 wood stud fire test rating of at least 45 minutes.

10. The gypsum panel of claim 8, wherein the core has a weight of from about 1450 lb/msf to about 1700 lb/msf.

11. A method of using the gypsum panel of claim 8, in residential construction, wherein the gypsum panel is fastened to studs having a 16 inch spacing or a 24 inch spacing.

12. A method of making a gypsum panel, comprising: combining gypsum stucco, water, and fiberglass to form a slurry; and setting the slurry to form a core having a thickness of about 14 inch, a weight of from about 1400 lb/msf to about 1750 lb/msf, and comprising fiberglass in an amount of from 1.5 lb/msf to 3 lb/msf and gypsum in an amount of from 1350 lb/msf to 1670 lb/msf,
    wherein the core has an ASTM E-I 19 wood stud fire test rating of at least 30 minutes and does not contain vermiculite.

13. The method of claim 12, wherein the core has an ASTM E-119 wood stud fire test rating of at least 45 minutes.

14. The method of claim 12, wherein the core has a weight of from about 1450 lb/msf to about 1700 lb/msf.

* * * * *

UNITED STATES PATENT AND TRADEMARK OFFICE
CERTIFICATE OF CORRECTION

| | |
|---|---|
| PATENT NO. | : 9,593,044 B2 |
| APPLICATION NO. | : 14/941777 |
| DATED | : March 14, 2017 |
| INVENTOR(S) | : Moore et al. |

Page 1 of 1

It is certified that error appears in the above-identified patent and that said Letters Patent is hereby corrected as shown below:

In the Claims

Column 10, Line 38:
Should read "thickness of about ½ inch, a weight…"

Signed and Sealed this
Fourth Day of June, 2019

Andrei Iancu
*Director of the United States Patent and Trademark Office*